UNITED STATES PATENT OFFICE.

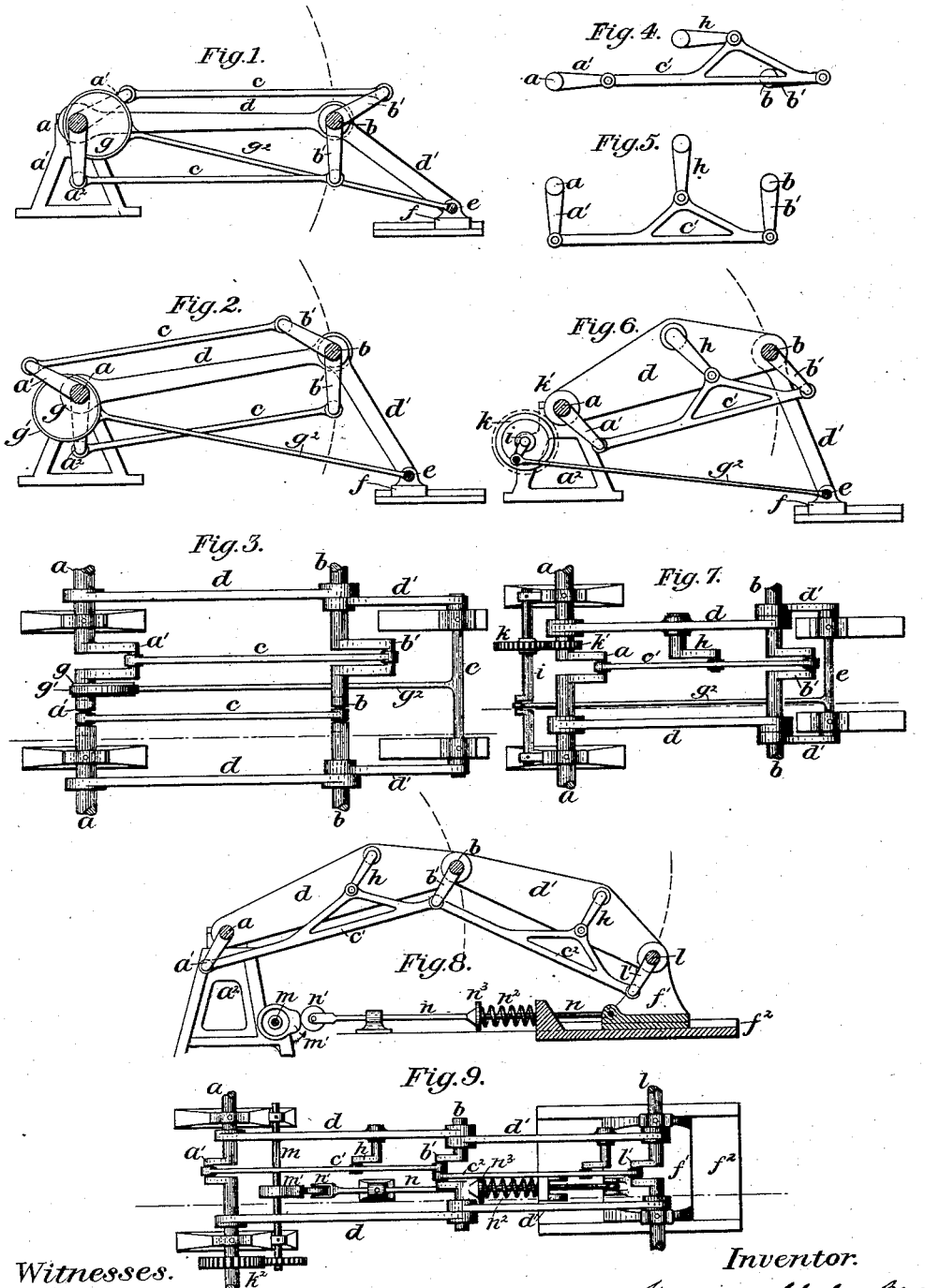

HERMANN SCHULZE-BERGE, OF ROCHESTER, PENNSYLVANIA.

DEVICE FOR CONVERTING MOTION.

SPECIFICATION forming part of Letters Patent No. 317,584, dated May 12, 1885.

Application filed March 28, 1885. (No model.)

*To all whom it may concern:*

Be it known that I, HERMANN SCHULZE-BERGE, of Rochester, in the county of Beaver and State of Pennsylvania, have invented a new and useful Improvement in Devices for Converting Motion; and I do hereby declare the following to be a full, clear, and exact description thereof.

My improvement consists in means for communicating the revolving motion of one shaft to a second or third shaft which is parallel with the first one, and at the same time communicating from the prime shaft to the said second or third shaft a continuous or intermittent reciprocating, oscillating, or other motion independent of its rotary motion. It is well known that a positive revolving motion cannot be transferred from one shaft or axle to another one except by gearing, link chains, or connecting-rods or pitmen. Experience has shown that for certain classes of machines gearing or link chains are not suitable for connecting two shafts—as, for instance, where very great power is used in machines requiring to be reversed instantaneously, or where both shafts attain a speed over a certain number of revolutions in a given time. In such cases pitman-connections are desirable. However, a pitman-connection between two revoluble shafts requires at least two cranks in each to overcome the dead-points, which cranks, if placed between the ends of the shafts, weaken them considerably. By the use of my improvement this difficulty is lessened one-half.

To enable others skilled in the art to make and use my invention, I will now describe it by reference to the accompanying drawings, in which—

Figure 1 is a side elevation of the connection between a driving and a driven crank-shaft. Fig. 2 is a like view of the same in another position. Fig. 3 is a plan view of the same. Figs. 4 and 5 are views of an improved pitman. Figs. 6 and 7 are respectively side and plan views of the said pitman as applied in the connection between two revoluble shafts. Figs. 8 and 9 are like views of a connection between a prime shaft and a second and third shaft in which said pitman is applied.

Like letters of reference indicate like parts.

In Figs. 1, 2, and 3, $a$ indicates the driving crank-shaft; $b$, the driven crank-shaft; $a'$ $b'$, the cranks, and $c$ the pitmen. The shaft $a$ is mounted in stationary bearings $a^2$, and the shaft $b$ is mounted in swinging bearings $d$ and $d'$. The swinging bearings $d$ radiate from and turn upon the shaft $a$ and the bearings $d'$ radiate from and turn upon a cross-head, $e$, which is mounted in sliding bearings $f$. Upon the shaft $a$ is an eccentric, $g$, provided with a yoke, $g'$, which is connected with the cross-head $e$ by a rod, $g^2$. It is evident that with this construction the revolution of the shaft $a$ will not only cause the shaft $b$ to revolve in the same direction, but also to oscillate in the arc of a circle of which $a$ is the center, as indicated in broken lines in Figs. 1 and 2, the latter movement being caused by the eccentric $g$ acting on the cross-head $e$ and communicating a reciprocating motion thereto, which motion is converted into an oscillating motion at the shaft $b$ by means of the swinging bearings $d'$. Thus a continuous oscillating motion is communicated from the revolving shaft $a$ to the revolving shaft $b$.

As before stated, the connection of two shafts by means of pitmen requires two cranks on each shaft in order to cause the driven shaft to pass over the dead-point, and that if such cranks are placed between the ends of the shafts they weaken them. This can be partly obviated, without danger of reverse motion, by the use of a single pitman, which connects with a crank on each shaft and with an intermediate crank, when the latter is mounted in a bearing not in line with the other two, or the three cranks are differently distanced when placed in line. This is illustrated in Figs. 4 and 5, where each shaft $a$ $b$ is provided with a single crank, $a'$ $b'$, and where they are connected by a single pitman, $c'$. Journaled in one of the swinging bearings $d$, out of line with shafts $a$ $b$, is a third crank, $h$, the pin of which is connected with a lateral extension of the pitman $c$, so as to be as far out of line with the pins of the other cranks as its journal is out of line with the shafts $a$ $b$. With this construction it is evident that if the crank of the driving-shaft $a$ stands on the dead-center with reference to the crank of the driven shaft $b$, the guide-crank $h$, not having completed its revolution, will prevent the possibility of a reverse motion of the crank $b'$ and shaft $b$, and will cause the pitman $c$ to move only through parallel planes. In this instance the cross-head $e$ is reciprocated by means of a crank-shaft, $i$, connected by gearing $k\, k'$ with the shaft $a$. The gear-wheel $k'$ is made relatively smaller than the wheel $k$, so that the shaft $b$ shall have a given number of revolutions during the time it is caused to move once through the arc of the circle (indicated by broken lines in Fig. 6) of which the shaft $a$ is the center.

In Figs. 8 and 9 I show a modification in which my invention is carried a step forward. In this construction I use two pitmen like that shown in Figs. 4 and 5, to make the connection between three shafts. The driving-shaft $a$ is connected with the shaft $b$ by a single pitman, $c'$, and the shaft $b$ in turn is connected with the shaft $l$ by a single pitman, $c^2$. The shaft $b$ is mounted in the swinging bearings $d$ $d'$, which are journaled on the shafts $a$ and $l$, respectively. The shaft $l$ is journaled in the sliding bearing $f'$. Mounted on the frame $a^2$ is a cam-shaft, $m$, which is driven by gearing $k^2$ from the shaft $a$, and is provided with a cam, $m'$. A rod, $n$, connected with the slide $f'$, extends toward the cam $m'$, and is provided with a roller, $n'$, which bears against the cam, being caused to do so by a spring, $n^2$, mounted on the rod between the collar $n^3$ and the adjacent edge of the slide-bed $f^2$. The rotation of the cam-shaft causes an outward movement to be given to the slide $f'$, and consequently to the shaft $l$, and the spring $n^2$ causes its retraction. By multiplying the cams on shaft $m$ or by accelerating its speed the number of reciprocations of the slide $f$ in a given number of revolutions of the shafts $l$ can be increased, and vice versa.

It is evident that many equivalent means may be adopted for reciprocating the slide $f'$, such as other kinds of springs, a weight, compressed air, steam, or other devices.

It will be understood that the simple oscillation of the driven shaft in an arc of a circle or its reciprocation in a right line are merely the elemental movements resulting from my construction, and that by the addition of other devices to modify the line or direction of the movement it can be adapted to the production of complex motions in many classes of machines.

The feature of the two crank-shafts having a pitman-connection, the driving-shaft mounted in stationary bearings and the driven one mounted in swinging bearings journaled on the driving-shaft, which underlies this improvement, is in itself very important, as it is applicable to various machines.

The feature of a driving-shaft having two power-connections with a driven shaft—one for communicating a revolving motion to the driven shaft and at the same an oscillating motion, either continuous or intermittent—is not only important in itself, but underlies the more complex structure illustrated in Figs. 8 and 9, in which a reciprocating motion of the ultimate driven shaft is obtained.

What I claim as my invention, and desire to secure by Letters Patent, is—

1. The combination of two crank-shafts with a connecting-pitman and a guide-crank connected to said pitman, substantially as and for the purposes described.

2. The combination of a driving-shaft and a driven shaft, connected together so that a revolving motion is communicated from the former to the latter, with a second power-connection between the said shafts, whereby an oscillating motion is given to the driven shaft in an arc of which the driving-shaft is the center, substantially as and for the purposes described.

3. The combination of a driving-shaft with two other shafts arranged in series, and connected together so that a revolving motion is communicated from the driving-shaft to the other two, and a second power-connection between the driving-shaft and the second driven shaft, whereby an oscillating motion is communicated to the first driven shaft and a reciprocating motion to the second, substantially as and for the purposes described.

4. The combination of the driving-shaft $a$, driven shafts $b$ $l$, pitmen $c'$ $c^2$, slide $f'$, cam $m'$, driven from shaft $a$, and spring-rod $n$, substantially as and for the purposes described.

5. The combination of a driving crank-shaft mounted in stationary bearings with a driven crank-shaft mounted in swinging bearings journaled on the driving-shaft, and pitman-connection between the said shafts, by which a revolving motion is communicated from the former to the latter, substantially as and for the purposes described.

In testimony whereof I have hereunto set my hand this 7th day of March, A. D. 1885.

HERMANN SCHULZE-BERGE.

Witnesses:
  W. B. CORWIN,
  THOMAS B. KERR.